United States Patent [19]

Mimeault

[11] 3,849,152

[45] Nov. 19, 1974

[54] POLYSILOXANE ENCAPSULATION OF PIGMENTS

[75] Inventor: Victor J. Mimeault, Shaker Heights, Ohio

[73] Assignee: Ferro Corporation, Cleveland, Ohio

[22] Filed: Nov. 6, 1972

[21] Appl. No.: 303,831

[52] U.S. Cl.......... 106/308 Q, 106/288 Q, 106/302, 106/309
[51] Int. Cl............................................... C09c 1/34
[58] Field of Search............ 106/288 Q, 308 Q, 302

[56] References Cited
UNITED STATES PATENTS

| | | | |
|---|---|---|---|
| 3,004,859 | 10/1961 | Lichtenwalner | 106/308 Q |
| 3,025,179 | 3/1962 | Holbein | 106/308 Q |
| 3,377,311 | 4/1968 | Rock | 106/308 Q |

Primary Examiner—Delbert E. Gantz
Assistant Examiner—J. V. Howard
Attorney, Agent, or Firm—Milton L. Simmons; Wesley B. Taylor

[57] ABSTRACT

Pigments, and particularly chrome-based pigments such as lead chromate, are disclosed having improved dispersion, color strength, and heat and light stability when incorporated, for example, in moldable polymeric resinous systems. Particles of the pigments are completely covered with a polysiloxane liquid at room temperatures. The polysiloxane is then polymerized in situ to a solid form completely to encapsulate and protect the enveloped pigment particles. Preferably the pigment particles contain reactive hydroxyl groups, and the polysiloxane reacts with the hydroxyl groups to aid in binding the polysiloxane envelope to the pigment particle.

7 Claims, 2 Drawing Figures

POLYSILOXANE ENCAPSULATION OF PIGMENTS

BACKGROUND OF THE INVENTION

Pigments are widely used in industry to impart color, for instance, in paints, moldable plastics, floor coverings, etc. Cadmium-based inorganic pigments are noted for their ability to meet extreme requirements of temperature stability and chemical resistance. However, these pigments are quite expensive, and accordingly the art has more readily adopted the lower-priced, chrome-based pigments as an attractive alternative. Unfortunately, chrome-based pigments such as lead chromate exhibit relatively poor heat stability, especially at elevated temperatures required for molding some of the pigmented thermoplastics, such as the polycarbonates, polystyrene, copolymers of acrylicnitrile and butadiene-styrene, nylon, and still others. This instability results in a discoloration (greening) of the molded part. Chrome-based pigments are also objectionable in that they are sensitive to alkalies and acids; stain in the presence of sulfides; and darken on exposure to light in addition to elevated temperatures, which may be the result of reduction of hexavalent chromium to trivalent chromium.

Past attempts to overcome such deficiencies usually involve treating the pigments, either chemically to neutralize the attacking agent and render it temporarily ineffective, or physically to bar the access of the agent to the pigment particle. For example, it has been proposed to coat the pigments with discrete particles of silica as disclosed, for example, in U.S. Pat. Nos. 3,370,971 and 3,639,133. In such cases, essentially finely divided silica is deposited on a pigment particle from an acidified silicate solution. However, the deposition often has to be repeated several times in order to insure sufficient coating.

Such silica coatings have not been entirely satisfactory in all applications. Coating pigment particles by discrete silica particles may suffice for some uses, but when such coated pigments are used for coloring thermoplastic resins the pigments do not always have sufficient protection to preserve good color stability. Because the silicate deposition is substantially one of discrete, minute particles about a relatively large pigment particle, the latter may not be completely or sufficiently enclosed and therefore not completely or sufficiently protected. For example, chrome-based pigments have a tendency to adsorb moisture from the atmosphere when the pigment is not entirely sealed-off by a coating of particulate silica. The adsorbed water reduces color or tinting strength of the pigment as well as its dispersibility in a resinous body or like matrix. Silica-coated pigments also exhibit a high degree of thixotropy when incorporated in a non-polar medium such as polyethylene resin. This is probably due to the increased surface area afforded by the particulate silica coating of the pigments.

A silica coating can also be easily abraded. In the usual use of pigments for coloring thermoplastic resins, the dried pigment is mixed with the solid granular resin, and the resulting mixture then subjected to vigorous mixing until homogeneity is obtained. Such mixing and rigorous handling actually abraids the silica coating on a pigment with resultant deterioration in chemical, thermal, and light resistance of the pigment. To combat these shortcomings of silica coated pigments, the art has added a further component such as a binder like wax, polyethylene, or abietic acid to help secure the silica deposition to the pigment particle and to retard water adsorption.

The effectiveness of pigments in general and of chrome-based pigments in particular for general application as colorants would be improved if their abrasion resistance and heat and light color stability could be improved without detriment to their tinctorial value or other desirable qualities.

SUMMARY OF THE INVENTION

In accordance with the present invention, pigments of improved heat, light and chemical stability are obtained by encapsulating particles of the pigment in a polysiloxane. The polysiloxane preferably provides its own binding action with the pigment particles to provide a completely encompassing, continuous, adherent, protective envelope.

In one form of the invention, the pigment particles are coated from solution with a polysiloxane that is liquid at room temperatures (about 65°F. to about 85°F.), and the polysiloxane is then polymerized in situ to a solid form. In the preferred practice of the invention, the pigment particles are provided with reactive hydroxyl groups prior to being coated with the polysiloxane. The partially cured polysiloxane reacts with the hydroxyl groups in coating particles and aids in binding the polysiloxane to the pigment particles. Subsequently, the polysiloxane is further polymerized. Accordingly, no binder as such is needed, and the pigment particles become completely encapsulated by the polysiloxane.

The particles of the pigments are of conventional size and coated with a sufficient amount of the polysiloxane, so that the polysiloxane consists from about 5% to about 35% by weight of the total combined weight of pigment and polysiloxane.

The preferred polysiloxanes useful in the invention are those known in the art as organopolysiloxanes and which comprise a repeating linear unit having the general formula:

(1)
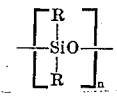

in which R is hydrogen, alkyl or cycloalkyl up to six carbon atoms, alkenyl or cycloalkenyl up to six carbon atoms, alkoxy up to four carbon atoms, or aryl or aralkyl up to ten carbon atoms, alkinyl up to three carbon atoms, or halogenated aryl up to six carbon atoms, and in which the R's may be the same or different. As applied to pigment particles, the polysiloxane is a curable prepolymer that is liquid at room temperatures. In this case, $n$ is a whole integer in the range of about 20 to 30. After polymerization in situ, $n$ is in excess of 30 and sufficiently high to make the polysiloxane solid at room temperatures. In preferred polysiloxanes, the two R's per linear unit are methyl and hydrogen, or dimethyl, or diphenyl, or methyl and phenyl.

BRIEF DESCRIPTION OF THE DRAWINGS

In the accompanying drawings.

DESCRIPTION OF THE PREFERRED EMBODIMENTS

Figure 1:
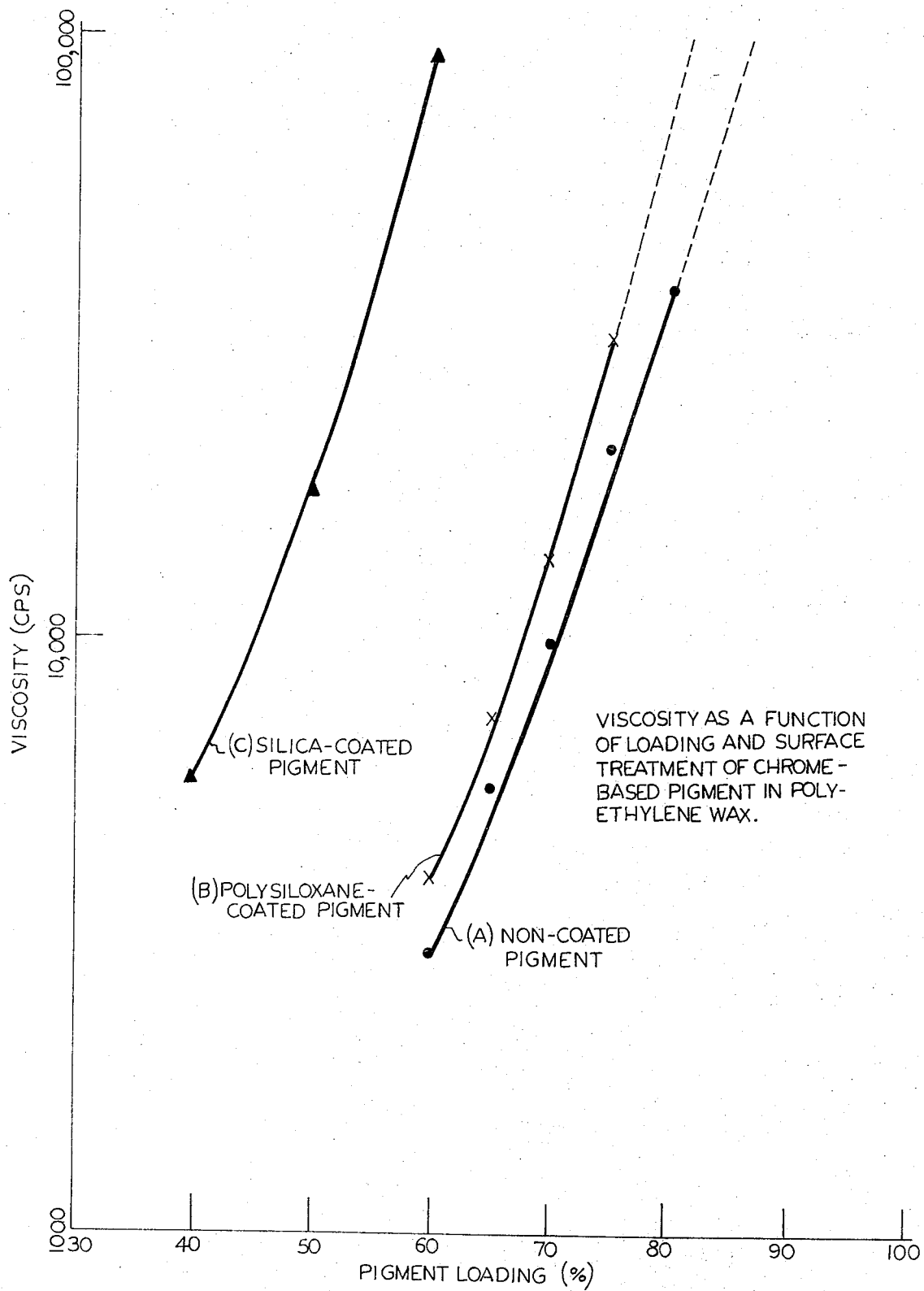
FIG. 1 is a graphical comparison of the effect of the amount of chrome-based pigment loading on the viscosity of polyethylene in which the pigment particles are untreated, polysiloxane-coated, and silica-coated.

The present invention may be practiced with any pigment, for example, pigments may be used of cobalt aluminates, titania, lithium cobalt phosphates, lithium cobalt borates, carbon blacks, iron oxides, the so-called iron blacks of iron-chromium-maganese alloys, and the like. However, the invention is especially adapted for use with chrome-based pigments because of their tendency to degrade when subjected to heat, although such pigments do have excellent hiding power and relatively low cost.

Chrome-based pigments comprise various forms of lead chromate. The term "lead chromate pigment" as used herein refers to a group of well known inorganic pigments which are widely used in industry and is taken to comprise all pigments which include lead chromate as a major component. These range from relatively pure lead chromate in monoclinic form to solid solutions containing lead sulfate or lead molybdate or both as substantial components. The term also includes the rhombic lead chromates stabilized in that crystal form in various ways, such as by the addition of trivalent aluminum ions and pyrophosphate ions; and coprecipitates such as a coprecipitate of lead chromate with either lead sulfate or lead molybdate or with both. Specific terms recognized in the art to indicate certain lead chromate pigments are: Chrome Yellow, Basic Lead Chromate, Lead Sulfochromate, and Molybdate Orange or Red.

While the pigments used may be of several different types and classifications, the encapsulating material must be a polysiloxane. Silanes are not suited for this purpose, because they do not themselves have the necessary temperature resistance. The encapsulation serves a number of purposes. The polysiloxane envelope not only insulates the pigment particles from heat and light with resultant avoidance of degredation and loss of color strength, but the envelope can also protect a resin from the pigment. For instance, some pigments affect the polymerization of polyester resins. The encapsulation also provides improved dispersion, abrasion resistance, higher tinting strength per unit weight of final product, and lower cost of processing. Still further, the polysiloxane encapsulation provides moisture resistance as hereinafter more fully described.

The polysiloxanes employed in this invention are those curable to a solid state. The polysiloxanes comprise linear chains having alternate silicon and oxygen atoms in which the silicon atoms bear organic substituents. The particular curable organopolysiloxane used is not critical and may be any of those known in the art. These polysiloxanes may be prepared by condensing a liquid organopolysiloxane containing an average of about 1.9 to 2.1 silicon-bonded organic groups per silicon atom. The condensing agents used are known in the art and may include, for instance, acid condensing agents like ferric chloride hexahydrate and still others.

Such curable organopolysiloxanes generally comprise polymeric diorganosiloxanes which may contain, for example, from about 0 to 2 mole percent copolymerized monoorganosiloxane, for example, copolymerized monomethylsiloxane.

The preferred polysiloxanes useful in the practice of the invention include those represented by Formula 1 of the preceding section. More particularly, the monovalent substituents represented by R may be the same or different and may be hydrogen, alkyl up to six carbon atoms, such as methyl, ethy, propyl, butyl, etc.,; cycloalkyl up to six carbon atoms, such as cycloprobyl, cyclohexyl, etc.; alkenyl up to six carbon atoms, such as vinyl, allyl, etc.; cycloalkenyl up to six carbon atoms, such as cyclohexenyl, etc.; alkoxy up to four carbon atoms, such as methoxy, ethoxy, etc.; aryl up to 10 carbon atoms, such as phenyl, tolyl, xylyl, naphthyl, etc.; aralkyl up to 10 carbon atoms, such as benzyl, phenylethyl, etc.; alkinyl up to three carbon atoms, such as ethinyl, etc.; and halogenated aryl up to six carbon atoms, such as chlorophenyl, dibromophenyl, etc.; the substituents are connected to the silicon atoms by carbon-silicon linkages.

The terminal groups of the polymer may also be R or hydroxyl. A specific preferred polysiloxane is one manufactured by Dow Corning Corporation under the trade designation "DC–1107" in which the R's of Formula 1 are methyl and hydrogen. As the liquid polysiloxane cures, hydrogen gas is evolved and the fluid condenses and becomes resinous in nature.

In practice, the pigment particles are slurried with an organic inert carrier liquid such as acetone, methylethyl ketone, ethylpropyl ketone, pentane, hexane, the halogenated hydrocarbons marketed under the trademark "Freon," or the like. After slurrying, the mixture is subjected to intensive mixing as with an ultrasonic probe. The liquid polysiloxane is then added in an amount to insure a polysiloxane coating about the particles constituting from about 5 percent to about 35 percent and preferably about 10 percent by weight of the particles. As indicated, it is preferred to use the polysiloxane as a liquid prepolymer, although the monomer can be used if desired. The slurry is continuously mixed during addition of the liquid polysiloxane.

In order to hasten the subsequent cure of the polysiloxane, a conventional catalyst may also be added to the slurry at this time. Any known catalyst for polysiloxane may be used, such as the metallic octoates, zinc, tin, cobalt octoates, etc., in an example amount of about 0.1 percent by weight of the polysiloxane. Mixing is continued until the slurry becomes homogeneous. The carrier liquid is then removed by any convenient means to leave the polysiloxane-coated pigment particles. This may be accomplished by evaporating the liquid at about room temperatures or by other techniques, such as by spray drying in which the polysiloxane-coated pigment particles are gathered in a cyclone collector. In any case, the polysiloxane coating is polymerized to a solidified form to provide the protective encapsulation. This is readily accomplished by heating the particles, for example, at about 110°C to about 160°C.

Although adsorption of water by a coated pigment is disadvantageous because of resulting loss of color or tinting strength and a reduction of dispersibility in a resinous body, in the present invention the presence of small amounts of water on the surface of the pigment prior to polysiloxane encapsulation has been found to be advantageous. Reactive hydroxyl groups on the surface of the pigment particles undergo chemical reaction with the polysiloxane more securely to bind the polysiloxane about the pigment particles. Further, since the polysiloxane encapsulation is continuous about the particles, the disadvantageous adsorption of water after preparation of the coated particles is entirely prevented. In this manner, the use of a binder as practiced by the prior art, as in combination with a silica coating, is entirely eliminated.

The hydroxyl groups that react with the polysiloxane may either be chemically bound with pigment particles or physically present as through water adsorption. Normally, exposure of pigment particles to ambient atmosphere results in adsorbing a sufficient amount of water from moisture in the atmosphere to meet the requirements of this aspect of the invention. However, positive steps may be taken, if desired, to insure that a sufficient amount of water is present on the pigment particles. For example, the pigment particles may be equilibrated with water vapor in a relative humidity chamber for the purpose of introducing hydroxyl groups onto the surface of the pigment particles prior to coating them with liquid polysiloxane.

The following examples are intended only to illustrate the invention and should not be construed to impose limitations upon the claims. Parts and percentages are by weight unless otherwise indicated.

EXAMPLE 1

Pigment Encapsulation

In the following examples, all pigments wherever used were encapsulated in the same manner as follows. If equilibration with water vapor was to be carried out, two pounds of the chrome-based pigment were so equilibrated in a humidity chamber having a constant relative humidity of a desired percentage. The pigment was slurried in trichloroethylene, acetone, or hexane at the rate of 0.5 gallon per pound of pigment. The exact amount is not critical. It is necessary only to maintain a sufficiently low viscosity for dispersion and subsequent processing. Enough liquid polysiloxane was then added to produce a 10 percent by weight coating on the particles based on the weight of the particles. The polysiloxane used was that sold by Dow Corning under the trade designation "DC-1107" which is a compound of Formula 1 in which the two R substituents are hydrogen and methyl.

The slurry was continually mixed during the addition of the polysiloxane and for sufficient time thereafter to insure homogeneity. If desired, a catalyst could be added at this time in the amount of 0.1 percent based on the weight of the polysiloxane. The slurry was then spray dried and the coated pigment particles collected in a standard cyclone collector. The coated pigments were then air dried at 110°C to complete the cure of the encapsulating polysiloxane film.

EXAMPLES 2 THROUGH 17

Sample Preparation and Testing

Pellets of powdered polystyrene was loaded with 1 percent of a pigment under test, the polystyrene injection molded as test chips, and the tristimulus color values of the chips then determined by standard means.

Each run or example comprised two test portions. For each separate pigment, one part was added to 99 parts of powdered polystyrene of injection molding grade and the resulting mixture divided into the two test portions. One portion was injection molded on a 1.5 ounce injection molding machine into standard rectangular test chips at an injection temperature of 250°C and a dwell time of 30 seconds. The second test portion of each sample was heat treated, that is, was injection molded in the same equipment into test chips at an injection temperature of 290°C and a dwell time of 180 seconds. The two chips of each example were then examined for color difference values. This procedure was also carried out on each pigment under test in which the pigmented particles had no polysiloxane encapsulation in order to provide data of a control sample which could be compared with test data on polystyrene chips having the same pigment particles but polysiloxane encapsulated.

The conventional tristimulus values X, Y, and Z for the test chips were obtained on a spectrophotometer. Hunter color differences values ($\Delta E$) were then computed from the tristimulus values from the following formula:

$$\Delta E = (L_1 - L_2)^2 + (a_1 - a_2)^2 + (b_1 - b_2)^2$$

in which:

$\Delta E$ is the total color difference,
$L$ is a measure of the reflectance ($L = 10Y^{1/2}$);
$a$ is a measure of the redness-greenness ($a = 17.5 (1.02X - Y)/Y^{1/2}$); and
$b$ is a measure of the yellowness-blueness ($b = 7.0 (Y - 0.847Z)/Y^{1/2}$).

The subscripts 1 and 2 refer to the regularly molded chips and heat-treated chips, respectively. High values of $\Delta E$ indicate poor heat stability. Table A lists the color differences of the resulting polystyrene test chips in which the $\Delta E$ values were obtained as described. In all examples, the polysiloxane used was Dow Corning's "DC-1107" which is a prepolymer conforming with Formula 1 and having hydrogen and methyl substituents for the indicated R's. In Table A, Examples 2, 9, 11 and 14 are controls for the indicated pigments. The abbreviations "TCE" and "ACET" indicate trichloroethylene and acetone, respectively. In Examples 7, 8, 10, 15 and 16, the pigment particles were equilibrated with moisture present in a relative humidity chamber having a percentage relative humidity as indicated for the examples.

Table A shows that polysiloxane encapsulation of pigment particles does improve their heat stability in polystyrene. The first set of values for L, a, and b were obtained at an injection temperature of 250°C and at dwell time of 30 seconds; the second set of values were obtained at 290°C and 180 seconds. Polystyrene having uncoated particles of chrome/yellow light, when molded into chips and the color of the chip determined as described, yielded a $\Delta E$ value of about 15, while polystyrene chips having the same type of lead chromate pigment particles but encapsulated with polysiloxane yielded $\Delta E$ values of about 5 to 6 in the main, (Examples 2–8).

TABLE A

Effect of Polysiloxane Encapsulation of Pigments on Elevated Temperature Color Stability of Pigmented Polystyrene

| Lead Chromate Pigment | Example | Polysiloxane Treatment | L | a | b | ΔE |
|---|---|---|---|---|---|---|
| Chrome Yellow Light | 2 | None (Control) | 72.8 | −3.3 | 47.9 | |
| | | | 60.4 | −4.0 | 38.8 | 15.5±3[1] |
| Chrome Yellow Light | 3 | 10%/TCE | 66.8 | −7.2 | 43.1 | |
| | | | 62.5 | −9.4 | 39.4 | 6.1 |
| Chrome Yellow Light | 4 | 20%/TCE | 63.4 | −6.5 | 40.5 | |
| | | | 59.0 | −7.8 | 36.7 | 6.0 |
| Chrome Yellow Light | 5 | 10%/ACET | 70.5 | −3.8 | 46.3 | |
| | | | 66.5 | −3.1 | 42.9 | 5.3 |
| Chrome Yellow Light | 6 | 10%/ACET | 72.1 | −4.4 | 46.9 | |
| | | | 64.6 | −3.8 | 41.6 | 9.2 |
| Chrome Yellow Light | 7 | pig.+H₂O 10%/ACET | 68.5 | −5.1 | 44.5 | |
| | | | 62.2 | −4.1 | 39.6 | 8.0 |
| Chrome Yellow Light | 8 | pig.+H₂O 15%/ACET | 69.6 | −3.1 | 45.6 | |
| | | | 64.6 | −2.0 | 41.8 | 6.4 |
| Chrome Yellow Medium | 9 | None (Control) | 70.5 | 9.3 | 47.2 | |
| | | | 54.7 | 1.7 | 35.4 | 21.2 |
| Chrome Yellow Medium | 10 | pig.+H₂O 20%/ACET | 57.9 | 9.2 | 38.1 | |
| | | | 49.7 | 6.1 | 31.5 | 11.0 |
| Chrome Orange | 11 | None (Control) | 45.0 | 44.0 | 28.6 | |
| | | | 37.3 | 25.5 | 22.7 | 21.0[2] |
| Chrome Orange | 12 | 10%/TCE | 42.8 | 40.6 | 27.5 | |
| | | | 40.1 | 35.0 | 25.3 | 6.6 |
| Chrome Orange | 13 | 10%/ACET | 44.8 | 40.9 | 26.4 | |
| | | | 38.1 | 29.6 | 23.1 | 13.5 |
| Molybdate Orange | 14 | None (Control) | 38.8 | 51.8 | 24.7 | |
| | | | 34.9 | 44.3 | 21.8 | 9.0 |
| Molybdate Orange | 15 | pig.+H₂O 10%/HEXANE | 35.9 | 49.6 | 22.2 | |
| | | | 34.2 | 44.4 | 20.6 | 5.7 |
| Molybdate Orange | 16 | pig.+H₂O 10%/ACET | 36.1 | 50.1 | 22.2 | |
| | | | 34.0 | 42.9 | 20.3 | 7.7 |
| Molybdate Orange | 17 | 10%/Freon[3] | 35.6 | 51.1 | 23.0 | |
| | | | 33.9 | 47.3 | 21.6 | 4.4 |

[1] L, a, b and ΔE are averages of four samples.
[2] L, a, b and ΔE are averages of two samples.
[3] Trichloro-monofluoromethane Similarly, ΔE changes for pigment particles of chrome yellow medium went from 21.1 for the control to 11.0 polysiloxane encapsulated pigment particles (Examples 9 and 10); corresponding ΔE changes for molybdate orange went from 9.0 to 5.7 (Examples 14 and 15).

EXAMPLE 18

Silica-coated pigments exhibit a high degree of thixotropy when incorporated in a nonpolar medium such as molten polyethylene wax. This is not true of the present polysiloxane-encapsulated pigments. The comparative effects of silica and polysiloxane encapsulation of pigments on the rheological properties of polyethylene containing such treated pigments were investigated as follows. In general, the lead chromate pigment, Chrome Yellow Medium, was dispersed in molten polyethylene using a two-inch shar blade rotating at 2,350 rpm. At higher loadings, a slight temperature increased was observed upon mixing. The temperature of the dispersion was always stabilized before obtaining viscosity measurements. The temperature of the container and contents was held at 250°F plus or minus two degrees by means of a heating mantle and temperature controller. Viscosity measurements as a function of loading and shear rate were obtained using a star-shaped rotor on a Haake rotoviscometer.

Three test runs were made: one in which the pigment was not treated at all; a second in which the pigment particles were encapsulated with 20 percent polysiloxane "DC-1107;" and a third in which the pigment particles were coated with 25 percent silica on the average. Table B summarizes the test data.

TABLE B

EFFECT OF POLYSILOXANE AND SILICA COATINGS ON THE RHEOLOGICAL PROPERTIES OF PIGMENTED POLYETHYLENE

| % Loading | Rotor Speed (rpm) | Non-Encapsulated Chrome Yellow Medium | Chrome Yellow Medium and 20% Polysiloxane | Chrome Yellow Medium and 25% Silica |
|---|---|---|---|---|
| 80 | 10.8 | 38,000 | | |
| | 21.6 | 26,000 | | |
| | 32.4 | 21,000 | | |
| | 64.8 | 15,500 | | |
| | 97.2 | 13,400 | | |
| | 194.4 | 10,600 | | |
| | 291.6 | 9,800 | | |
| 75 | 10.8 | 21,000 | 31,500 | |
| | 21.6 | 14,800 | 24,700 | |
| | 32.4 | 12,100 | 21,800 | |
| | 64.8 | 9,000 | 18,300 | |
| | 97.2 | 7,800 | 16,800 | |
| | 194.4 | 6,200 | 13,900 | |
| | 291.6 | 5,600 | 12,400 | |
| 70 | 10.8 | 9,900 | 13,600 | |
| | 21.6 | 7,100 | 10,800 | |
| | 32.4 | 5,800 | 9,500 | |
| | 64.8 | 4,200 | 8,000 | |
| | 97.2 | 3,600 | 7,300 | |
| | 194.4 | 3,100 | 5,700 | |
| | 291.6 | 2,500 | 5,400 | |
| 60 | 10.8 | 3,000 | 3,950 | 93,000 |
| | 21.6 | 2,500 | 3,080 | 50,000 |
| | 32.4 | 2,060 | 3,000 | 35,000 |
| | 64.8 | 2,060 | 2,620 | 22,000 |
| | 97.2 | 1,780 | 2,260 | 17,000 |
| | 194.4 | 1,540 | 2,000 | 10,000 |
| | 291.6 | 1,420 | 1,870 | 8,400 |
| 50 | 10.8 | | 3,500 | 17,900 |
| | 21.6 | | 2,800 | 11,700 |
| | 32.4 | | 2,570 | 9,000 |
| | 64.8 | | 2,060 | 6,000 |
| | 97.2 | | 1,680 | 4,600 |
| | 194.4 | | 1,510 | 3,200 |
| | 291.6 | | 1,300 | 2,600 |
| | 10.8 | | | 5,900 |

TABLE B-Continued

EFFECT OF POLYSILOXANE AND SILICA COATINGS ON THE RHEOLOGICAL PROPERTIES OF PIGMENTED POLYETHYLENE

| % Loading | Rotor Speed (rpm) | Non-Encapsulated Chrome Yellow Medium | Chrome Yellow Medium and 20% Polysiloxane | Chrome Yellow Medium and 25% Silica |
|---|---|---|---|---|
| 40 | 21.6 | | | 4,000 |
| | 32.4 | | | 3,300 |
| | 64.8 | | | 2,300 |
| | 97.2 | | | 2,000 |
| | 104.4 | | | 1,530 |
| | 291.6 | | | 1,330 |

(1)Extrapolated values from a plot of log of viscosity vs. log of rotor speed in rpm.

Figure 2:
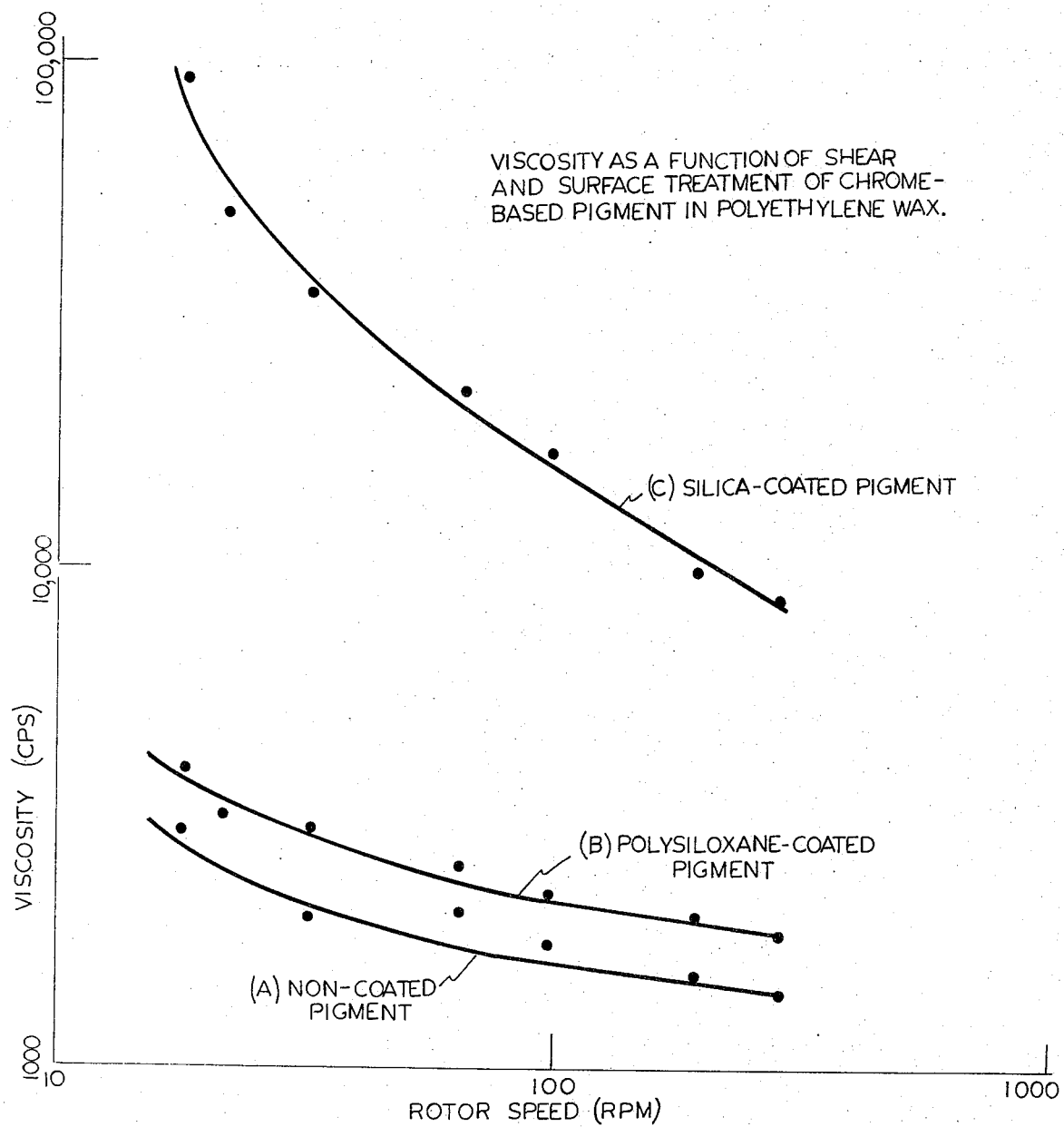
FIG. 2 is a graphical comparison on the effect of variable rotor speed (shear) on the viscosity of polyethylene, having a constant load of a chrome-based pigment in which the pigment particles are also untreated, polysiloxane-coated, and silica coated.

The graphs of FIGS. 1 and 2 are based on the data of Table B. In FIG. 1, percent pigment loading is plotted against viscosity in centipoises, using data for a rotor speed of 10.8 revolutions per minute. In FIG. 2, rotor speed (as a measure of shear) is plotted against viscosity in centipoises at a constant pigment loading of 60 percent.

In each figure, a line is plotted for each treatment of the pigment particles, namely, no coating, a polysiloxane coating in accordance with the present invention, and a silica coating. It will be noted that the rheological properties imparted to polyethylene by the polysiloxane coating are almost the same as those imparted by the untreated particles, and a substantial improvement over those properties imparted to polyethylene by silica-coated pigment particles.

It is, therefore, apparent from Table B and FIGS. 1 and 2 that the polysiloxane encapsulation improves the rheological properties of polyethylene containing pigment particles so treated as compared to polyethylene containing silica-coated pigments. The difference between the polysiloxane encapsulated pigments and the silica-coated pigments is in the nature of the surface presented to the polyethylene matrix. In the former, the surface is primarily a compatible, organic substituted one and in the latter the surface is similar to silica itself. Further, the polysiloxane encapsulation lowers the oil adsorption properties of the pigment particles, while a silica coating increases the oil adsorption. The rapid rate of change of viscosity with changes in loading makes it difficult to reproduce the data exactly, especially at high loadings. However, the trend as shown by Table B and FIGS. 1 and 2, namely, that the polysiloxane treatment reduces both viscosity and thixotrophy of polyethylene as compared with polyethylene having corresponding loadings of silica-coated pigments, is unmistakable and definitely reproducible.

The continuous, coherent polysiloxane covering which completely envelops pigment particles in accordance with the present invention thus not only improves the color strength and heat stability of resinous systems in which the particles are incorporated, but the polysiloxane envelope improves the dispersibility of the encapsulated pigment particles in such systems. The continuous covering further provides water resistance so that the pigments are less susceptible to color change due to adsorbed water. Other advantages of the invention include ease of coating the pigment particles, good abrasion resistance, and reduced cost of processing.

While the foregoing describes presently preferred embodiments of the present invention, it is understood that the invention may be practiced in still other forms within the scope of the following claims.

I claim:

1. Completely encapsulated pigment particles of improved dispersion, color strength, and heat and light stability for incorporation into a moldable polymeric resinous system, said pigment being a chrome-based pigment, and the encapsulation of said particles being a completely encompassing, continuous, adherent, protective envelope consisting essentially of a polysiloxane having a sufficient polymeric growth to be solid at room temperatures.

2. The encapsulated pigment particles of claim 1 in which said polysiloxane consists essentially from about 5 to about 35 percent by weight of the total combined weight of pigment particles and polysiloxane.

3. The pigment of claim 1 in which said polysiloxane has a repeating linear unit having the general formula:

in which R is hydrogen, alkyl or cycloalkyl up to six carbon atoms, alkenyl or cycloalkenyl up to six carbon atoms, alkoxy up to four carbon atoms, aryl or aralkyl up to ten carbon atoms, alkinyl up to three carbon atoms, or halogenated aryl up to six carbon atoms, said R's being the same or different, and $n$ is a whole integer in excess of thirty and sufficiently high to make the polysiloxane solid at room temperatures.

4. The pigment of claim 1 in which said continuous envelope includes the reaction product of said polysiloxane and reactive hydroxyl groups on the surface of at least one of said particles to bind the covering to said one particle.

5. A process for preparing encapsulated chrome-based pigment particles of improved dispersion, color strength, and heat and light stability for incorporation into a moldable polymeric resinous system, comprising admixing said pigment particles with a polysiloxane liquid at room temperatures and in an amount to coat said particles completely, and then heating the coated particles to polymerize the polysiloxane in situ to a solid form.

6. The process of claim 5 including providing reactive hydroxyl groups on said pigment particles prior to enveloping said particles with the polysiloxane, and subsequently reacting said polysiloxane with said hydroxyl groups to aid in binding the polysiloxane to the pigment particles.

7. The process of claim 5 in which said liquid polysiloxane has a repeating linear unit having the general formula:

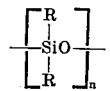

in which R is hydrogen, alkyl or cycloalkyl up to six carbon atoms, alkenyl or cycloalkenyl up to six carbon atoms, alkoxy up to four carbon atoms, aryl or aralkyl up to ten carbon atoms, alkinyl up to three carbon atoms, or halogenated aryl up to six carbon atoms, said R's being the same or different, and $n$ is a whole integer in the range of 20 to 30.

* * * * *